Figure 1:
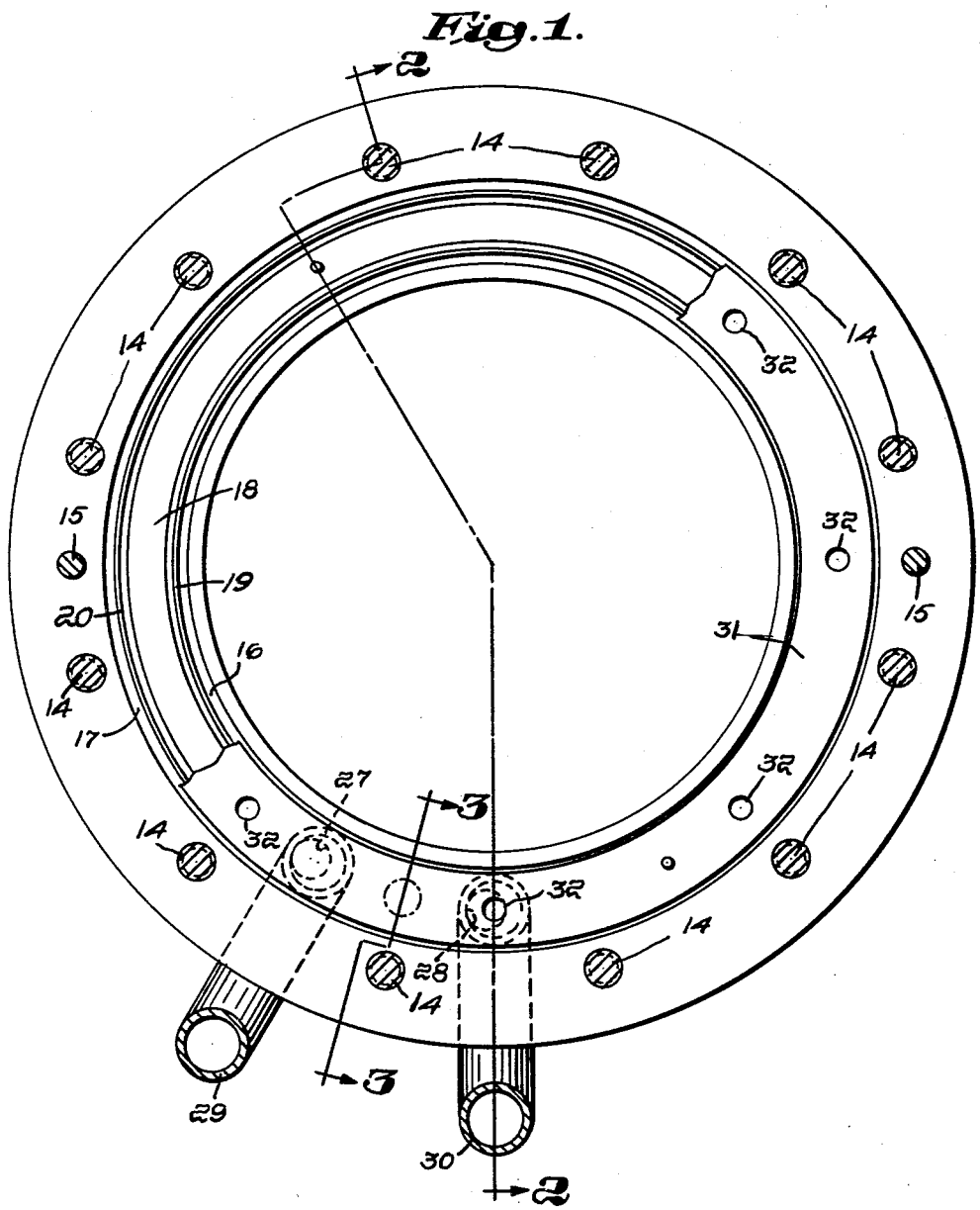

Aug. 4, 1964 W. C. CROCKER 3,143,240
SEAL FOR VACUUM CHAMBERS
Filed July 29, 1963 2 Sheets-Sheet 1

Inventor:
Walter C. Crocker,
by Arthur D. Thomson
Attorney

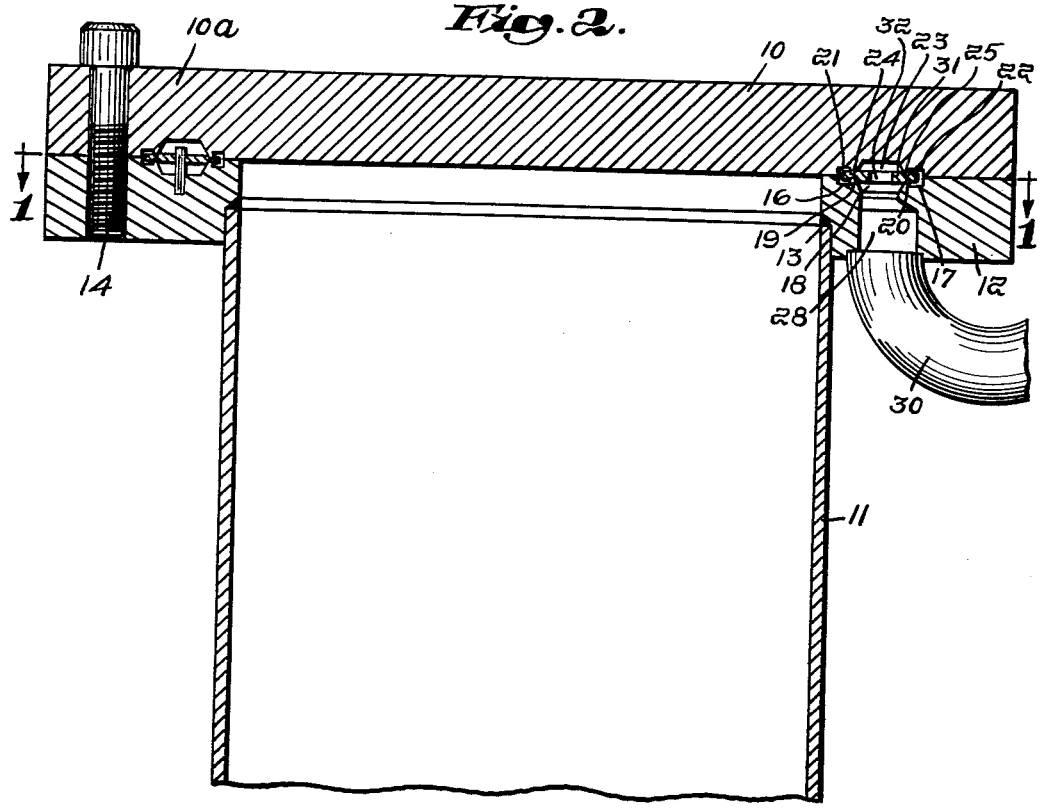
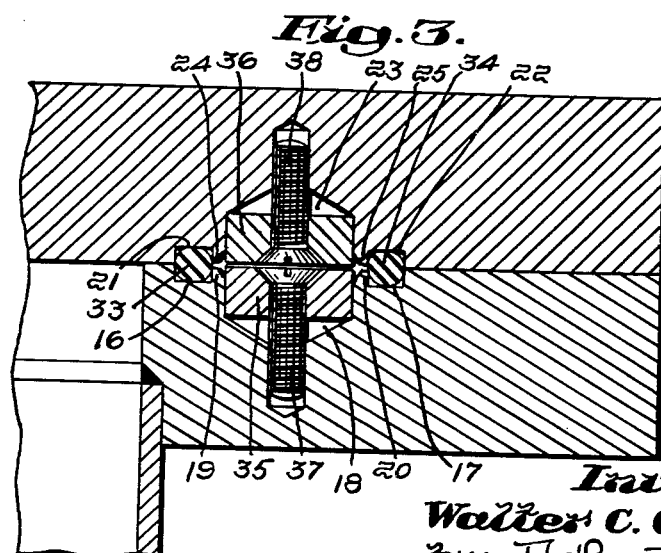

United States Patent Office 3,143,240
Patented Aug. 4, 1964

3,143,240
SEAL FOR VACUUM CHAMBERS
Walter C. Crocker, South Weymouth, Mass., assignor to High Vacuum Equipment Corporation, Hingham, Mass., a corporation of Massachusetts
Filed July 29, 1963, Ser. No. 298,169
5 Claims. (Cl. 220—46)

This invention relates to vacuum chambers and more particularly to seal constructions for forming an airtight seal around a cover for an opening or port in the wall of the chamber.

Elastic gaskets, such as O-rings are adequate for sealing joints, for example, between a cover and the chamber wall, in vacuum chambers intended for many high vacuum applications. Where an ultra-high vacuum is required, however, metal to metal seals must be used. As the construction of connecting flanges and other parts associated with the seals is different for the two types of seals, a vacuum system designed for one range of vacuum cannot readily be converted for operation in another range.

The principal object of this invention is to provide a seal construction which permits either elastomer or metal seals to be used interchangeably, so that a vacuum system can be readily adapted for operation in either the high or the ultra-high vacuum range. Another object is to make provision for chilling or evacuating the seal region with either type of seal. Another object is to provide a seal construction which can be incorporated in a vacuum system with a minimum of expense. Other objects, advantages, and novel features will be apparent from the following description.

The connection between a removable cover and the wall of a vacuum tank is commonly made by means of mating flanges, one on the tank and one on the cover, which are bolted or clamped together. According to this invention, the flanges are each provided with spaced concentric grooves and an intermediate channel, and spaced concentric ribs between the grooves and the intermediate channel. The grooves receive a pair of O-rings, in cases where an elastomer type of seal is desired. When a metal seal is required, the O-rings are omitted and a flat, thin, metal ring, which extends across the intermediate channel and partly across the grooves so as to overlie the ribs, is inserted between the flanges. The ribs bite into the metal ring, which is preferably made of a metal somewhat softer than that of the flanges, and form spaced, concentric metal to metal seals.

In the drawings illustrating the invention:
FIG. 1 is a cross-section taken along line 1—1 of FIG. 2 illustrating a vacuum tank with a connecting flange constructed according to the invention, the metal seal ring being shown partly broken away;
FIG. 2 is a transverse cross-section taken along line 2—2 of FIG. 1 of a tank and cover, the tank being shown partly broken away, with a metal seal ring in place; and
FIG. 3 is an enlarged fragmentary cross-section taken along line 3—3 of FIG. 1, illustrating the O-rings in place.

The seal construction is illustrated as applied to a removable end plate 10 and a cylindrical tank 11. A flange 12 is welded at 13 to the tank. The end plate has a rim portion 10a overlying flange 12, and is secured to the tank by bolts 14. A pair of locating pins 15, FIG. 1, are pressed into flange 12 and are received in aligned holes in the cover.

The flange has in its upper side a pair of spaced concentric, rectangular grooves 16 and 17, and an intermediate channel 18. The side walls of the channel are bevelled and at their upper portions, form narrow edged ribs 19 and 20.

The rim portion 10a of the cover, has a pair of concentric grooves 21 and 22, and an intermediate channel 23 separated from the grooves by ribs 24 and 25. These grooves, channel, and ribs, conform in configuration to grooves 16, 17, channel 18, and ribs 19 and 20, and corresponding parts are in register when the end plate is in place on the tank.

Flange 12 has inlet and outlet ports 27 and 28 respectively, communicating with channel 18, and inlet and outlet pipes 29 and 30. One pipe may be shut off and the other connected to a vacuum pump to evacuate the space within channels 18 and 23. Alternatively, refrigerating fluid may be circulated through this space to chill the seal region.

When a metal to metal seal is required, a thin flat range 31 of relatively soft metal such as aluminum is placed between the flange 12 and the cover. This ring extends between mating ribs 19 and 24 and mating ribs 20 and 25. The ring is provided with holes 32 in the region disposed in channels 18 and 23, to permit evacuation of channel 23. When the end plate is bolted down, the ribs bite into ring 31 to form spaced, concentric metal to metal seals.

For applications where elastomer seals are desired, a pair of O-rings 33 and 34 are placed in grooves 16, 21 and 17, 22, as shown in FIG. 3. The O-rings are of a diameter somewhat larger than the combined depth of the grooves so that the rings are compressed when the plate and flange are drawn together. A pair of blocks 35 and 36 are mounted, by screws 37 and 38 in channels 18 and 23 respectively to reduce direct flow between ports 27 and 28 when refrigerant is circulated in the channels.

It is understood that this seal construction can be used around all openings in the wall of a vacuum tank in conjunction with any type of removable cover or coupling. For example, this seal may be used around a hinged access door, a framed sight glass, or a pipe coupling.

The grooves, ribs and channel may be formed directly in the wall of the tank or in flanges or projections formed integrally in the wall of the tank. The seal construction may also be used in couplings between sections of pipe in a vacuum system.

A vacuum tank installation originally equipped with inexpensive elastomer seals for high vacuum work, can be readily converted for ultra-high vacuum work by removing the O-rings around all the openings and substituting metal rings of appropriate diameters. No alteration of the tank or the various cover plates and couplings is needed when changing from one type of seal to the other. The cost, time, and labor involved in converting a vacuum system for operation in a different range of vacuum is thus greatly reduced. The cost of manufacture of such systems is also reduced, as the same tank and connecting parts are suitable for constructing systems for either vacuum range, thus permitting standardization of parts.

I claim:
1. A sealing device, for a vacuum system, comprising a first enclosure member having an opening therein, a second enclosure member coupled to said first member around said opening, said first member having a pair of spaced grooves and a pair of spaced ribs surrounding said opening and facing toward said second member, and said second member having a pair of grooves and a pair of ribs opposing and registering with the respective grooves and ribs of said first member, each of said ribs constituting one wall of one of said grooves, and seal means disposed between said members and disposed at least partially in said registering pairs of grooves.

2. A sealing device as described in claim 1, said seal means comprising a pair of elastomer gaskets disposed on said registering pairs of grooves.

3. A seal device as described in claim 1, said seal means comprising a flat rigid ring passing between and gripped by said registering pairs of ribs.

4. A sealing device as described in claim 1, each of said members having a recessed channel intermediate its ribs and grooves, and one of said members having inlet and outlet openings communicating with its channel.

5. A sealing device, for a vacuum system, comprising a first enclosure member having an opening therein, a second enclosure member coupled to said first member around said opening, said first member having a pair of spaced grooves and a pair of spaced ribs surrounding said opening and facing toward said second member, and said second member having a pair of grooves and a pair of ribs opposing and registering with the respective grooves and ribs of said first member, each of said ribs constituting one wall of one of said grooves of said members having registering recessed channels intermediate said registering pairs of ribs and grooves, and a flat seal ring extending between said registering channel and registering pairs of grooves and ribs and gripped by said ribs, said seal ring having openings disposed in said channels.

References Cited in the file of this patent
UNITED STATES PATENTS

| | | |
|---|---|---|
| 978,346 | Yarrow | Dec. 13, 1910 |
| 2,764,311 | Blackman | Sept. 25, 1956 |
| 2,898,000 | Hanny | Aug. 4, 1959 |